United States Patent [19]

Kuster et al.

[11] Patent Number: 5,352,263
[45] Date of Patent: Oct. 4, 1994

[54] METHOD AND APPARATUS FOR BENDING GLASS PLATES IN A HORIZONTAL POSITION

[75] Inventors: Hans-Werner Kuster, Aachen, Fed. Rep. of Germany; Luc Vanaschen, Eupen, Belgium

[73] Assignee: Saint-Gobain Vitrage International, Courbevoie, France

[21] Appl. No.: 59,137

[22] Filed: May 10, 1993

[30] Foreign Application Priority Data

May 9, 1992 [DE] Fed. Rep. of Germany ....... 4215285

[51] Int. Cl.⁵ .................................... C03B 23/035
[52] U.S. Cl. ........................ 65/106; 65/104; 65/273; 65/289
[58] Field of Search .............. 65/104, 106, 268, 273, 65/289

[56] References Cited

U.S. PATENT DOCUMENTS

| | | |
|---|---|---|
| 3,775,085 | 11/1973 | Bognar . |
| 3,778,244 | 12/1973 | Nedelec et al. . |
| 4,609,391 | 9/1986 | McMaster .................. 65/104 |
| 4,682,997 | 7/1987 | Halberschmidt et al. . |
| 4,746,348 | 5/1988 | Frank ........................ 65/104 |
| 4,859,225 | 8/1989 | Kuster et al. . |
| 4,990,170 | 2/1991 | Vanashen et al. ............ 65/104 |
| 5,066,321 | 11/1991 | Kramer et al. ............... 65/289 |
| 5,090,989 | 2/1992 | Adoline ...................... 65/273 |
| 5,160,524 | 11/1992 | Pernelle et al. ............. 65/268 |

Primary Examiner—Joye L. Woodard
Attorney, Agent, or Firm—Oblon, Spivak, McClelland, Maier & Neustadt

[57] ABSTRACT

In a method for bending glass plates, the glass plates are heated in a horizontal position in a continuous furnace (1) to the bending temperature and in a following bending chamber (5) are pressed by an upwardly flowing hot gas stream against a convex bending mold (7) positioned above the conveying plane. The bent glass plates (3') are placed on a displaceable shaping ring (13) and transferred with the latter into a following cooling station (16). The glass plates (3) are raised from the conveying roller train (2) of the continuous furnace (1) by a suction plate (3) are positioned relative to the transfer ring (28) on the latter. With the aid of the transfer ring (28) the glass plates (3) are transferred into the bending chamber, where in the end position of the transfer ring (28) they assume the desired end position relative to the bending mold (7).

11 Claims, 3 Drawing Sheets

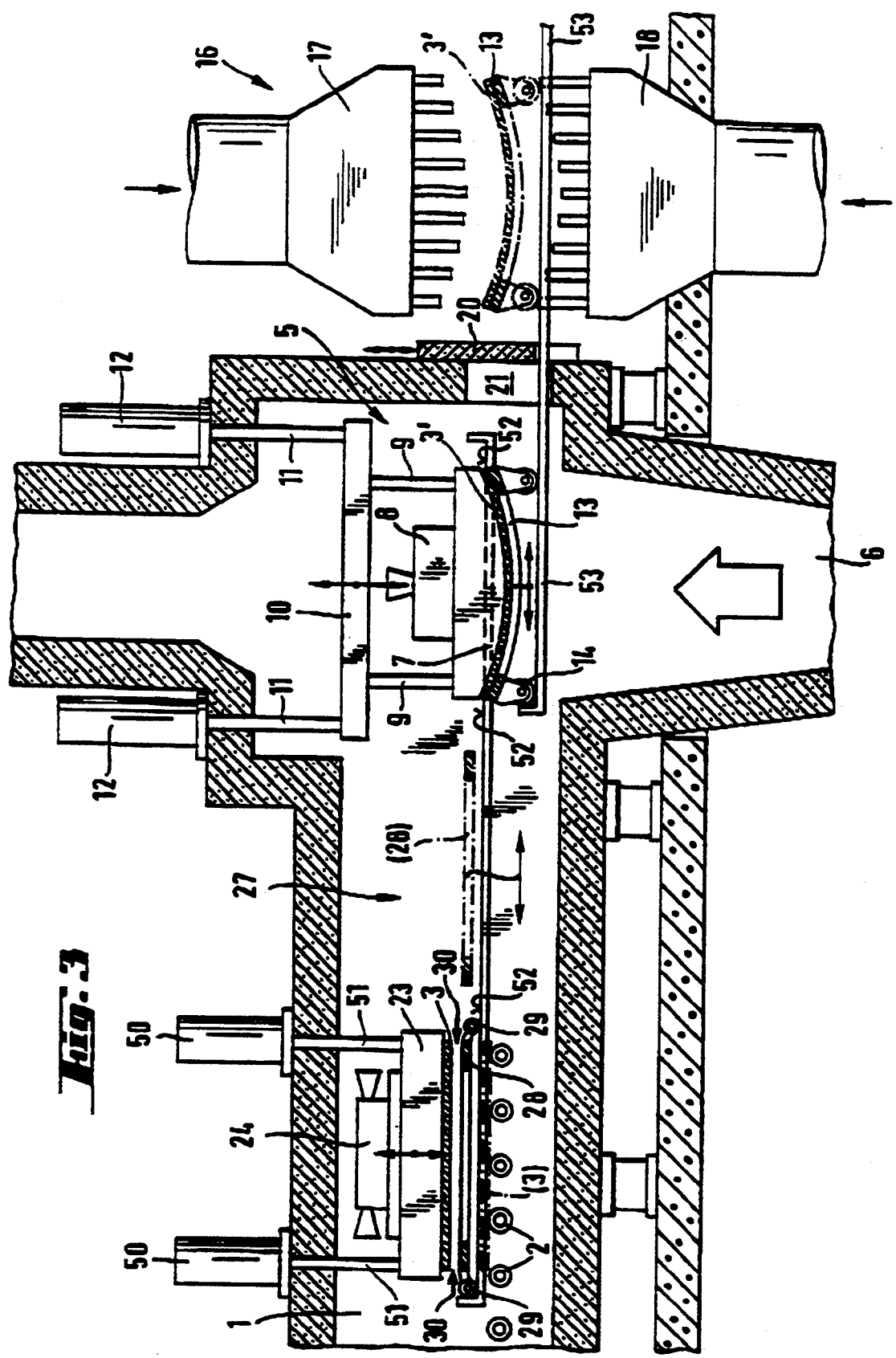

METHOD AND APPARATUS FOR BENDING GLASS PLATES IN A HORIZONTAL POSITION

BACKGROUND OF THE INVENTION

1. Field of the Invention

The invention relates to a method and an apparatus for bending glass plates, in which the glass plates are heated to the bending temperature in a horizontal position in a furnace including a conveyor and transferred into a bending chamber in which they are raised by a differential gas pressure against a convex bending mold positioned above the conveying plane of the glass plates, are bent into their final shape and with the aid of a shaping ring corresponding to the final glass plate shape and are transferred from the bending chamber into a following cooling station.

2. Description of the Related Art

A method of the aforementioned type is known from U.S. Pat. No. 4,682,997. In this known method the glass plates are transferred from the roller-type continuous furnace into the following bending chamber on driven conveying rollers. The glass plates are raised from the conveying rollers in the bending chamber by means of an upwardly flowing, hot gas stream and pressed against the upper bending mold.

Another method of the aforementioned type is described in U.S. Pat. No. 3,778,244. In this known method the conveying roller train also extends from the roller-type continuous furnace into the bending chamber. In this case the glass plates are raised from the conveying rollers by suction. The vacuum required for the suction process is applied along the circumferential edge of the bending mold.

In order to achieve good quality, the glass plates heated to the bending temperature within the bending chamber must initially be very accurately positioned on the conveyor, which is generally of the roller-type, i.e., brought into the correct position with respect to the bending mold before being raised from the conveying rollers by the hot gas stream or by suction, followed by pressing against the upper bending mold. This positioning process is time consuming and lengthens a bending cycle time.

SUMMARY OF THE INVENTION

It is an object of the present invention to further develop the bending method defined hereinbefore so that the bending cycle time is reduced and consequently the economics of the method are further improved.

According to the invention this problem is solved in that, within the furnace, the glass plates are raised from a conveyor with the aid of a suction plate, placed on a transfer ring displaceable within the bending chamber and, with the aid of the transfer ring, are transferred into position with respect to the bending mold at the end position of the transfer ring in the bending chamber.

In the method according to the invention, the process of positioning the glass plates with respect to the upper bending mold is performed in two steps, namely a first step during which the glass plates are brought into a precise position with respect to a mechanically guided intermediate member, i.e., the transfer ring, and a second step in which the transfer ring is brought into its clearly defined end position below the bending mold. The second positioning step, namely the transfer of the transfer ring into the bending chamber, can be carried out accurately and relatively rapidly. However, the first positioning step, which takes up much more time, can be performed during the bending in the bending chamber of the preceding glass plate or when the bending chamber is still occupied by the preceding glass plate, i.e., the bent glass has still not been removed from the bending chamber. As a result of the subdivision of steps of the process and upstream displacement of the positioning step in accordance with the invention, it is possible to significantly reduce the bending cycle time and therefore improve the economics of the method according to the invention.

The method according to the invention can be performed with any process according to which the glass plate is raised from its conveying plane and pressed against the upper mold by means of a differential gas pressure, for example an upwardly flowing hot gaseous current or suction through the upper mold or at its periphery.

The invention relates also to a bending apparatus with a furnace, a bending chamber with an upper bending mold positioned in a raisible and lowerable manner above the conveying plane of the glass plate and means for producing a differential gas pressure for raising the glass plates from the conveying plane against the bending mold, a cooling station following the bending chamber and means for the transfer of the bent glass plates into the cooling station. According to the invention, the apparatus also comprises an intermediate station located between the conveyor ending upstream of the bending chamber and the latter, a suction plate movably arranged above the end portion of the conveyor, a transfer ring displaceable between an end position below the suction plate and an end position below the bending mold and means for positioning the glass plate relative to the transfer ring.

BRIEF DESCRIPTION OF THE DRAWINGS

Further features and advantages of the invention can be gathered from the following description of different embodiments of the method according to the invention and apparatuses for the performance thereof with respect to the attached drawings, in each case in the from of a vertical longitudinal section through a bending furnace and wherein:

FIG. 3 is yet another embodiment of an apparatus suitable for performing the method according to the invention.

DETAILED DESCRIPTION OF THE PREFERRED EMBODIMENTS

Figure 1:
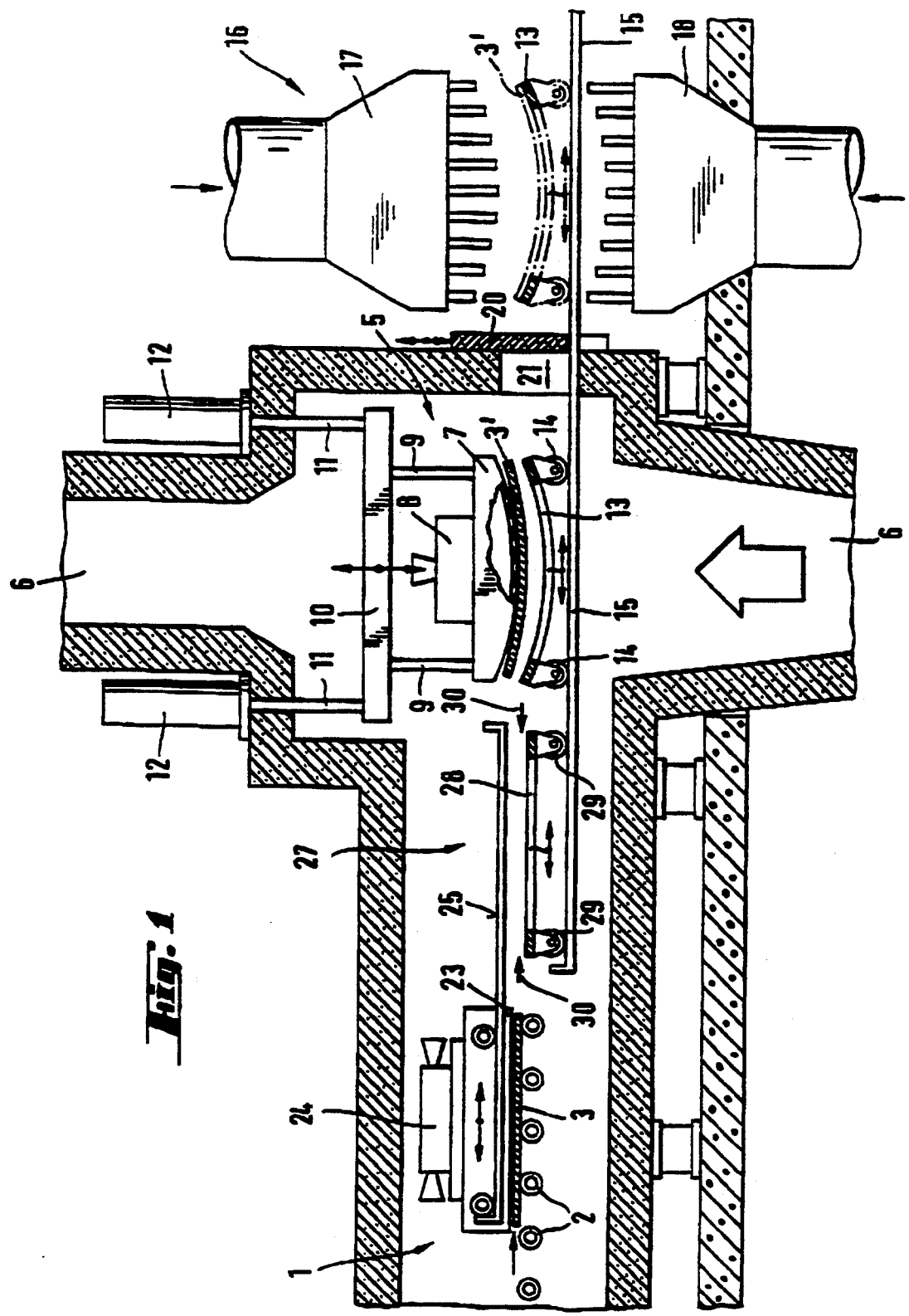
FIG. 1 is a first embodiment of an apparatus for performing the method.

The installation shown in FIG. 1 includes a roller-type continuous furnace 1 with a conveying train formed from driven conveying rollers 2, on which the planar glass plates 3 are heated to their bending temperature during their continuous preheating movement. It also includes a bending chamber 5, which is located within a vertically positioned flow channel 6, in which vertically rising hot air streams with a given volume flow during the bending process. This hot gas stream presses the glass plate 3 in the bending chamber against the upper bending mold 7 which is in the form of a full-surface, convex mold. The bending mold 7 is provided on its bending surface with openings which are connected to a cavity and which, by means of a fan 8, can be placed under a vacuum. The bending mold 7 is fixed by means of struts 9 to a frame 10, which can be moved up and down by means of rods 11 and a lifting mechanism 12.

A shaping ring 13 cooperates with the upper bending mold 7 and its upper bending surface corresponds to the desired shape of the glass plate and to the upper bending mold 7. The shaping ring 13 is movable in the longitudinal direction of the furnace by means of wheels 14 on rails 15. With the aid of this movable shaping ring 13, following the bending process, the bent glass plate 3' is transferred into the cooling station 16 following the bending chamber 5. The cooling station 16 contains suitable blowing plenums 17, 18, which direct the cooling air onto the bent glass plates 3' while they are resting on the shaping ring 13. During this cooling process the door 20 closes the opening 21 through which the glass plates are discharged from the bending chamber 5.

Within the roller-type continuous furnace 1 a horizontally displaceable, planar suction plate 23, which is provided with a suction fan 24, is located above the final conveying rollers 2. The suction plate 23 can move backwards and forwards on rails 25 between an end position above the conveying rollers 2 and an end position in an intermediate station 27 located between the conveying rollers 2 and the bending chamber 5.

Between the intermediate station 27 and the bending chamber 5 a transfer ring 28, which is mounted on wheels 29, can move backwards and forwards on the rails 15 between an end position in the intermediate station 27 and an end portion in the bending chamber 5. The transfer ring 28 can be a ring with a planar surface adapted to the glass plate contour. However, it is instead also possible to use a transfer ring with a slightly bent or curved surface, so that the glass plate undergoes a slight gravitational deformation prior to the following bending in the bending chamber 5. The drive mechanisms for the suction plate 23, the transfer ring 28 and the shaping ring 13, which are conventional constructions, have been omitted from the drawings for reasons of simplicity.

The intermediate station 27 also contains suitable positioning means, e.g., plungers, which are shown in the form of arrows 30. With the aid of these plungers the glass plates placed on the transfer ring 28 are moved into precise position relative to the transfer ring 28.

The sequence within a bending cycle is as follows. As soon as a glass plate 3 heated to its bending temperature arrives at the end of the conveying train comprising the conveying rollers 2, it is raised from the conveying rollers by the suction plate 23 and secured by the latter. The suction plate 23 now travels with the glass plate 3 into the intermediate station 27 and places said glass plate 3 on the transfer ring 28, which at this time assumes its end position in the intermediate station 27. The glass plate 3 is brought into the desired position with respect to the transfer ring 28 with the aid of the movable plungers 30.

The means for positioning the glass plates with respect to the transfer ring, e.g., the plungers, may be mounted either on the latter or independently in the area below the suction plate or the transfer ring.

During this transfer and positioning process the preceding glass plate 3' is still in the bending chamber 5. As a result of the upwardly flowing hot gas stream it is pressed against the convex surface of the bending mold 7. The shaping ring 13, which in the meantime has returned from the cooling station 16 into the bending station, is located in the precise bending position below the upper bending mold 7. The bending mold 7 is now lowered and presses the largely already prebent glass plate 3' against the shaping ring 13. At this instant a brief overpressure in the cavity within the bending mold 7 releases the glass plate 3' from the latter and the bending mold 7 returns to its upper end position.

As soon as the bending mold 7 has freed the path for the movable shaping ring 13 and the transfer ring 28, the door 20 opens and the shaping ring 13 travels together with the bent glass plate into the cooling station 16. Simultaneously the transfer ring 28 with the glass plate positioned thereon travels from the intermediate station 27 into the bending station 5. When the transfer ring 28 reaches its fixed end position, the hot gas stream is switched on so that the glass plate is raised from the transfer ring 28 and pressed against the upper bending mold 7. The transfer ring 28 now moves back into its starting position and again frees the bending chamber 5 for the shaping ring 13, which, after the preceding glass plate has cooled and been removed from the bending ring, again moves into the bending chamber 5 and assumes its end position below the bending mold. The described process then starts anew.

Figure 2:
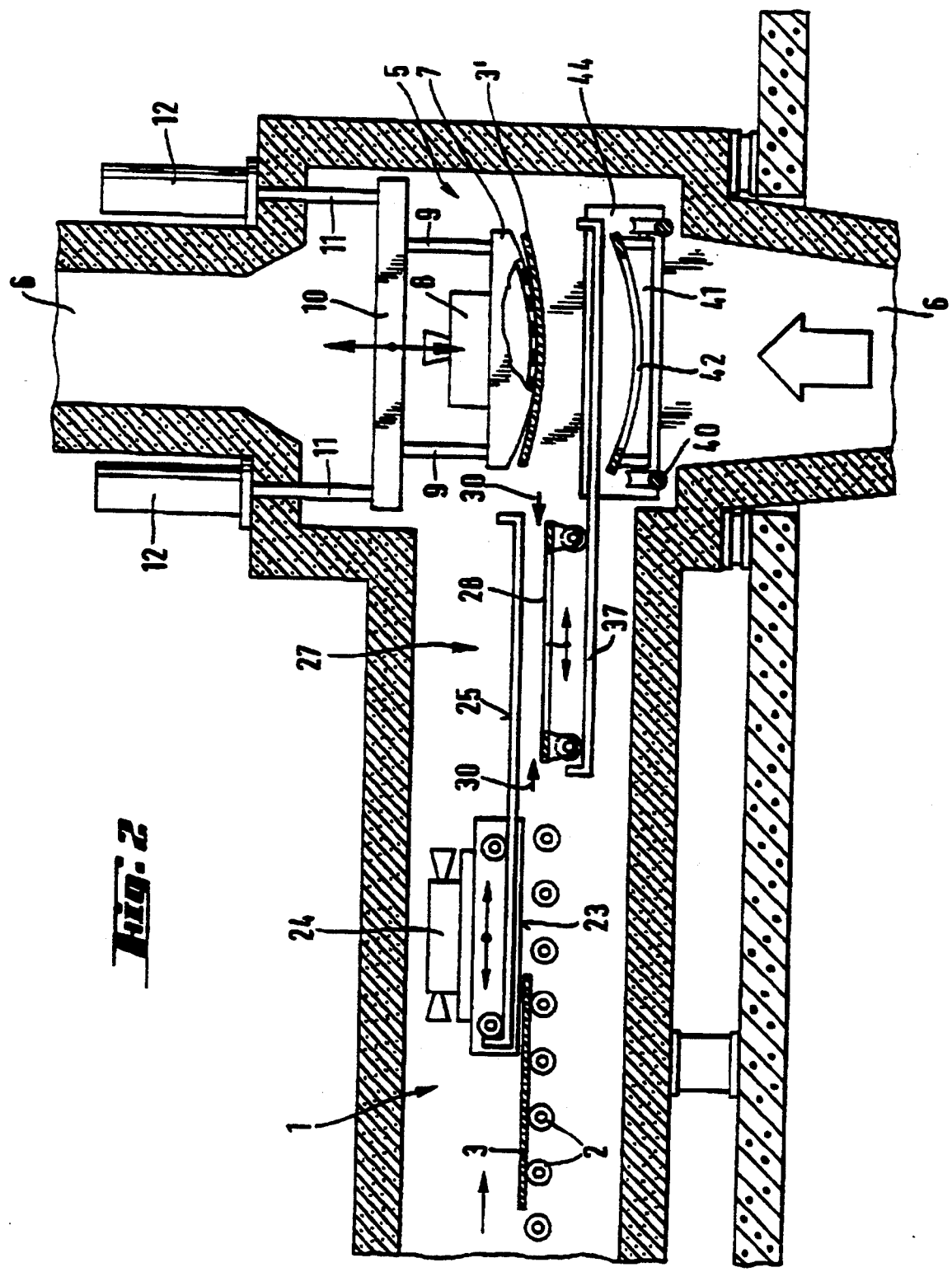
FIG. 2 is a second embodiment of an apparatus for performing the method.

A further shortening of the cycle times of such a bending furnace can be achieved with an apparatus like that shown in FIG. 2. In this case the transfer of the glass plates 3, heated to the bending temperature, into the bending chamber 5 and the transfer of the bent glass plates 3' from the bending chamber 5 into the cooling station take place completely independently of one another in two different planes. In this way it is possible to provide on each side of the bending chamber a cooling station into which the bent glass plates are alternately transferred.

The installation also comprises a continuous furnace 1, an intermediate station 27 and a bending chamber 5, which are successively arranged in the longitudinal axis of the furnace. The suction plate 23 movable on the rails 25 once again transfers the glass plates 3 heated to the bending temperature from the conveying rollers 2 in the intermediate station 27 to the transfer ring 28, which is movable on the rails 37 into a clearly defined position below the bending mold 7.

In the bending station 5, and below and transverse to the rails 37, are provided rails 40, on which are displaceable two trolleys 41 (only one is shown), each of which carries a shaping ring 42. On each of the two side walls 43 the bending chamber 5 is provided an opening 44 (only one is shown) leading to a cooling station. The rails 37 extend into the cooling stations on either side of the bending chamber. The two successively arranged trolleys 41 are firmly coupled together, or there are two bending rings 42 on a common trolley 41. The bending rings have a spacing corresponding to that between a bending station and the cooling station. Thus, in the working position, one of the two shaping rings 42 assumes a clearly defined position below the bending mold 7, while the other shaping ring simultaneously assumes its end position in the associated cooling station, in which the glass plate is cooled and subsequently removed from the bending ring.

The operation of this apparatus fundamentally corresponds to the procedure described above, i.e. the transfer of the glass plate 3 from the conveying rollers 2 to the transfer ring 28, as well as the positioning of the glass plate on the transfer ring 28, take place while the frame 10 with the bending mold 7 is lowered in the bending chamber and the preceding glass plate is pressed into its final shape and placed on the shaping ring 42. As soon as the frame 10 with the bending mold 7, after having placed the bent glass plate on the shaping ring 42, has again been brought into the upper starting position, the path for the transfer ring 28 into the bending chamber is freed and the transfer ring 28 with the next glass plate moves into the bending chamber 5. Simultaneously, the shaping ring 42 with the bent glass plate is transferred into the cooling station associated therewith, while from the other cooling station the shaping ring from which the glass plate has been removed is simultaneously moved into its end position below the bending mold 7.

In the apparatus shown in FIG. 3, and contrary to what has been described in the previously described embodiments, the suction plate 23 is not horizontally movable and is instead mounted so as to be vertically raisible and lowerable. For this purpose it is fixed to rods 51 which can be transferred into different height positions by lifting mechanisms 50 positioned above the furnace roof. The suction plate 23 can in this way, after it has taken the glass plate 3 from the conveying rollers 2, be raised to such an extent that the transfer ring 28 on the rails 52 can move into its end position below the suction plate 23. When the glass plate 3 has been placed on the transfer ring 28, a suitable mechanical means, such as, e.g., the schematically indicated plungers 30, carries out the precise positioning of the glass plate 3 with respect to the transfer ring 28.

When, following a bending process in the bending chamber 5, the bending mold 7 has been returned to its upper position and the bent glass plate 31 has been transferred into the following cooling station with the aid of the shaping ring 13 movable on the rails 53, the transfer ring 28 with the glass plate 3 positioned thereon moves from the end position below the suction plate 23 into the other end position in the bending chamber 5. Immediately after reaching the end position of the transfer ring 28 in the bending chamber, the glass plate 3 is raised from the transfer ring 28 by the hot gas stream and pressed against the bending mold 7. The transfer ring 28 then moves back to its waiting position in the intermediate station 27 and consequently frees the bending chamber 5 for performing the bending process. The transfer ring 28 waits in the intermediate station 27 until the suction plate 23 has raised the next glass plate 3 from the conveying rollers 2 and has assumed its raised position. The transfer ring 28 then moves into its end position below the suction plate 23 and the described process starts anew.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of bending glass plates, comprising the steps of:
    using a suction plate to raise and hold a heated glass plate;
    transferring the heated glass plate from the suction plate to a transfer ring;
    displacing the transfer ring having the heated glass plate thereon into a bending chamber and beneath an upper bending mold of the bending chamber;
    using a differential gas pressure to raise the heated glass plate from the transfer ring and to apply the heated glass plate to the upper bending mold so as to bend the heated glass plate;
    using a shaping ring to further bend the glass plate applied to the bending mold; and
    using the shaping ring to transfer the bent glass sheet from the bending chamber to a cooling station.

2. The method of claim 1, including the step of further bending another glass plate applied to the upper bending mold during said step of transferring the heated glass plate to the transfer ring.

3. The method of claim 2, including the step of using the shaping ring to transfer the bent another glass plate from the bending chamber to the cooling station during said step of displacing the transfer frame having the heated glass plate thereon into the bending chamber.

4. The method of claim 1, wherein said differential gas pressure comprises an upwardly flowing hot gas stream in said bending chamber.

5. The method of claim 1, wherein said differential gap pressure comprises suction applied through said upper bending mold.

6. An apparatus for bending heated glass plates, comprising:
    a bending chamber including an upper bending mold vertically movably positioned therein;
    a furnace including a conveyor for conveying heated glass sheets;
    an intermediate station having a portion located between said conveyor and said bending chamber, said intermediate station including a suction plate for raising a glass plate from said conveyor;
    a planar transfer ring displaceable between a position beneath said suction plate and another position beneath said upper bending mold for transferring a heated glass plate from said furnace into said bending chamber to be bent;
    means for correctly positioning the heated glass plate on said transfer ring relative to said transfer ring;
    means for producing a differential gas pressure in said bending chamber;
    a cooling station; and
    a shaping ring movable between said cooling station and the position beneath said upper bending mold for transferring the bent glass plate to said cooling station.

7. The apparatus of claim 6, wherein said suction plate is mounted in said furnace so as to be horizontally displaceable.

8. The apparatus of claim 6, wherein said suction plate is mounted in said furnace so as to be vertically displaceable.

9. The apparatus of claim 6, wherein said means for correctly positioning is mounted to said transfer ring.

10. The apparatus of claim 6, wherein said means for correctly positioning is independent of said transfer ring.

11. The apparatus of claim 6, wherein said shaping ring is mounted so as to be movable in a direction transverse to a direction of movement of said transfer ring.

* * * * *